Patented Dec. 30, 1941

2,267,772

UNITED STATES PATENT OFFICE 2,267,772

REFRACTORY AND METHOD OF MAKING THE SAME

Eugene Wainer and Donald Sangree Hake, Niagara Falls, N. Y., assignors to The Titanium Alloy Manufacturing Company, New York, N. Y., a corporation of Maine No Drawing. Application July 20, 1939, Serial No. 285,580

9 Claims. (Cl. 106—57)

This invention relates to refractory materials and the method of making the same. More particularly, it relates to novel and improved zircon refractories and refractory compositions.

An examination of the thermal properties of zircon would lead one to believe that this material constitutes an excellent base for preparation of very high temperature super refractories. However, the material in fabricated form suffers from a serious defect at high temperatures. So far as is known, no zircon base refractory composition has yet been made which will not sag under its own suspended weight when heated in excess of 2900° to 3100° F., although the true melting point or softening point may be 1000° F. above this range. Also, all zircon refractories hitherto known to us have very poor resistance to compressive load at 2900° F. to 3000° F. These imperfections are believed principally due to two factors, namely, certain impurities in the zircon base and the shape of the zircon grains. As to the former, relatively small amounts of titania or iron oxide markedly reduce the high temperature strengths of zircon refractories, less than 1% of each of these ingredients being sufficient to deplete the desirable qualities of zircon. As to the latter, the rounded form of the commonly occurring zircon grain is believed to induce grain over grain slippage at high temperature. It has also been suggested that zircon tends to dissociate into zirconia and silica when heated for any length of time at 2800° to 3000° F., and that the silica formed would tend to cause the brick to fail at the approximate range of temperature at which a silica brick will fail, namely, 1600° to 1650° C.

It is therefore an object of this invention to produce a zircon refractory which does not sag at 3200° to 3250° F. under its own weight when a brick of the material is suspended by the corners at this temperature. It is another object to produce such a refractory which has excellent resistance to load at high temperatures. It is still another object to produce a zircon refractory which in general is far superior to other zircon refractories from standpoint of cold strength, type of porosity, resistance to slag attack, etc. Other objects will appear hereinafter.

In accordance with this invention, we have found that apparently the prime requisite for the development of good refractory properties with high hot strength in zircon was the formation of uniformly sized, well developed tetragonal crystals of zircon interengaging or interlocking with the zircon grains of the refractory base. In the usual preparation of zircon for formation into a refractory, it is at least partially milled to a relatively small grain size, which causes the zircon crystals to conchoidally fracture. It has now been found, in accordance with this invention, that by adding certain mineralizers to the brick batch, forming and then drying and firing, the desired well-developed crystals of zircon are formed in the firing cycle, these crystals interengaging or interlocking with adjacent grains of the zircon refractory base, to form a strong solid mass of zircon crystals.

Such mineralizers are chiefly combinations involving the use of fluosilicates. For example, of particular value is the combination of zircon plus a minor quantity of sodium fluosilicate, plus a minor quantity of phosphoric acid. Zircon crystals are also formed in a brick batch consisting of zircon plus a minor quantity of sodium fluosilicate, plus a minor quantity of zirconium dioxide.

The quantities of mineralizers which are suitable in the practice of this invention must be controlled within certain limits, in order to secure refractory bodies which are suitable at elevated temperatures. Compositions containing 2 to 4 parts of sodium fluosilicate plus 4 to 7 parts of phosphoric acid per 100 parts of zircon or 100 parts of mixed refractory containing zircon are satisfactory. Compositions containing 2 to 4 parts of sodium fluosilicate plus 1 to 4 parts of zirconium dioxide per 100 parts of zircon or other refractory are also satisfactory. In the latter case the best results are given by equimolecular proportions of sodium fluosilicate and zirconium dioxide (e. g. approximately 3 parts of the former to 2 parts of the latter). When refractories are prepared within these composition limits, they are able to support their own weight without sagging when suspended at the corners at temperatures of 3200° to 3250° F., and do not suffer from reheat shrinkage or cracking. Compositions outside these limits, on the other hand, suffer from one or more of these defects.

It has also been found that best results are secured by using zircon containing less than 0.2% $TiO_2$ and less than 0.1% $Fe_2O_3$.

The grain size of the original zircon is of importance when the commercial application is to be considered. A brick which is expected to have high resistance to corrosion and excessive strengths at high temperature should have the size of the pores present reduced to a minimum and should be as highly vitrified as possible. Such a brick will have relatively poor resistance to heat shocks. A brick which is expected to have high resistance to thermal shock usually must have a relatively coarse structure and be not very highly vitrified. When the zircon material used in compounding the brick consists wholly of at least minus 200 mesh material and preferably minus 325 mesh material, and containing the mineralizers of the present invention, bricks are formed under proper conditions which are semi-vitrified, have a very fine pore space and high resistance to corrosion by slags, and show excellent high temperature properties but with relatively poor resistance to thermal shock. To prepare a brick with high resistance to thermal shock, it is necessary to use a mixture of grain sizes. For example, a satisfactorily sized zircon is one which consists of equal parts of minus 200 mesh zircon and minus 35 plus 120 mesh zircon. Using the present novel combinations with such zircon, bricks are formed under proper conditions with high resistance to thermal shock and good high temperature properties but with less resistance to slag attack than the brick constructed wholly of fines. Such a brick shows equally good resistance to load at high temperatures as the fine structured brick and only slightly less resistance to sagging when suspended at high temperature than the fine structured brick.

In place of sodium fluosilicate, the fluosilicates of the other alkalies and alkaline earths may be substituted in whole or in part on an equimolecular basis for sodium fluosilicate. However, from the standpoint of economy and ease of use, sodium fluosilicate is the most suitable. Of the various acids which may be used we have found phosphoric acid to be the most suitable.

With the present novel combinations shapes may be prepared by ramming, pressing or casting. Highly porous insulating ware of excellent high temperature properties may be made by incorporating in the mix a properly sized organic material such as coke, cork, or sawdust, shaping appropriately, drying and firing.

The methods by means of which the invention is practiced are illustrated by the following examples:

Example 1

100 pounds of pure zircon (at least 98% $ZrSiO_4$ and 0.2% $TiO_2$, 0.1% $Fe_2O_3$) milled through 325 mesh is mixed with 3.0 pounds of sodium fluosilicate, 5.5 pounds of phosphoric acid of specific gravity 1.71 and 85% content, and 6.0 pounds of water. The batch is thoroughly mixed until the liquids are well dispersed through the solids and the damp mixture is shaped by ramming or pressing. The piece is slowly dried until all free water is expelled and then fired on schedule to 2400° F. to 2600° F.

Example 2

100 pounds of pure zircon consisting of 50 pounds of minus 200 mesh particles and 50 pounds of minus 35 plus 120 particles are compounded and mixed in the same manner as in Example 1 using 4 pounds of water instead of 6. Dry and fire as in Example 1.

Example 3

Add to the raw batch prepared in Example 1, 30 liters of granulated cork of minus 20 plus 60 grain size. Add sufficient water to produce a well plasticised mass, mix thoroughly until the cork is evenly distributed through the mass. Cast into metal molds. The plastic mass is slowly dried in the mold and is then removed for the firing operation. Fire as in Example 1 to 2400° F. to 2600° F.

Example 4

Same as Example 1 except use 2.0 pounds of zirconium dioxide (minus 325 mesh) in place of the phosphoric acid and 9 pounds of water in place of 6 pounds of water.

Example 5

Same as Example 2 except use 2.0 pounds of zirconium dioxide (minus 325 mesh) in place of the phosphoric acid and 7 pounds of water in place of 4 pounds of water.

Example 6

Same as Example 3 except use 2.0 pounds of zirconium dioxide (minus 325 mesh) in place of the phosphoric acid.

The reason for the improved results obtained by the present invention is due to the formation of zircon crystals in the fired bond proper. In the case of the phosphoric acid combination this is apparently due to pyrochemical action of the fluosilicate on the thermal reaction product of zircon and phosphoric acid. In the case of the zirconium dioxide combination, the reaction of the sodium fluosilicate and zirconium dioxide forms zircon at the firing temperatures, which adds onto the original zircon grains to produce interlocking crystals of zircon. While compositions outside the ranges disclosed exhibit this type of mineralization to a certain extent, in none was the effect so pronounced or as well developed as in the satisfactory range listed.

The invention also contemplates refractories containing materials other than zircon as the refractory base but in which zircon is one of the constituents. For example, a mixture of zircon and mullite could be used as the refractory base.

As many variations are possible within the scope of this invention, it is not intended to be limited except as defined by the appended claims.

We claim:

1. A refractory composition comprising zircon, a minor quantity of a fluosilicate, and a minor quantity of a material taken from the class consisting of phosphoric acid and zirconium dioxide.

2. A refractory composition comprising zircon, a minor quantity of sodium fluosilicate, and a minor quantity of a material taken from the class consisting of phosphoric acid and zirconium dioxide.

3. A refractory composition comprising zircon, a minor quantity of a fluosilicate, and a minor quantity of phosphoric acid.

4. A refractory composition comprising zircon, a minor quantity of a fluosilicate, and a minor quantity of zirconium dioxide.

5. A refractory composition comprising a refractory base containing zircon, 2% to 4% of sodium fluosilicate and 4% to 7% of phosphoric acid based on the weight of the refractory base.

6. A refractory composition comprising a refractory base containing zircon, 2% to 4% of sodium fluosilicate and 1% to 4% of zirconium dioxide based on the weight of the refractory base.

7. The method of forming a refractory comprising mixing zircon, a minor quantity of a fluosilicate, and a minor quantity of a material taken from the class consisting of phosphoric acid and zirconium dioxide, shaping, drying, and firing at an elevated temperature.

8. The method of forming a refractory comprising mixing a refractory base containing zircon, 2% to 4% of sodium fluosilicate and 4% to 7% of phosphoric acid based on the weight of the refractory base, and firing at an elevated temperature.

9. The method of forming a refractory comprising mixing a refractory base containing zircon, 2% to 4% of sodium fluosilicate and 1% to 4% of zirconium dioxide based on the weight of the refractory base, and firing at an elevated temperature.

EUGENE WAINER.
DONALD SANGREE HAKE.